(12) United States Patent
Suzuki et al.

(10) Patent No.: US 11,938,965 B2
(45) Date of Patent: Mar. 26, 2024

(54) INFORMATION SERVICE METHOD FOR VEHICLE DISPATCH SYSTEM, VEHICLE DISPATCH SYSTEM, AND INFORMATION SERVICE DEVICE

(71) Applicant: Nissan Motor Co., Ltd., Kanagawa (JP)

(72) Inventors: Masayasu Suzuki, Kanagawa (JP); Masahide Nakamura, Kanagawa (JP); Masaki Watanabe, Kanagawa (JP); Daisuke Saito, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 634 days.

(21) Appl. No.: 17/254,424

(22) PCT Filed: Jun. 22, 2018

(86) PCT No.: PCT/IB2018/001021
§ 371 (c)(1),
(2) Date: Dec. 21, 2020

(87) PCT Pub. No.: WO2019/243861
PCT Pub. Date: Dec. 26, 2019

(65) Prior Publication Data
US 2021/0114618 A1    Apr. 22, 2021

(51) Int. Cl.
*B60W 60/00* (2020.01)
*G05D 1/00* (2006.01)
(Continued)

(52) U.S. Cl.
CPC ....... *B60W 60/0011* (2020.02); *G05D 1/0212* (2013.01); *G06F 16/2282* (2019.01);
(Continued)

(58) Field of Classification Search
CPC .................. B60W 60/0011; G06Q 10/047; G08G 1/0967
See application file for complete search history.

(56) References Cited

U.S. PATENT DOCUMENTS

2017/0169366 A1   6/2017 Klein et al.
2017/0192437 A1*  7/2017 Bier ..................... G05D 1/0077
(Continued)

FOREIGN PATENT DOCUMENTS

JP       2003173497 A    6/2003
JP        200446404 A    2/2004
(Continued)

*Primary Examiner* — Jaime Figueroa
*Assistant Examiner* — Jerrod Irvin Davis
(74) *Attorney, Agent, or Firm* — Osha Bergman Watanabe & Burton LLP

(57) ABSTRACT

Vehicle allocation system includes an information provision apparatus, a first apparatus: control apparatus, and a user's second apparatus: user terminal apparatus. Processor of the information provision apparatus calculates a first driving plan for a vehicle in response to request information. When a second driving plan different from the first driving plan is calculated based on detection information acquired from the vehicle, the processor determines the cause of a change in the driving plan on the basis of the detection information. The processor transmits cause information including the cause to the user terminal apparatus. The user terminal apparatus presents the cause information on a display.

11 Claims, 11 Drawing Sheets

(51) Int. Cl.
 *G06F 16/22* (2019.01)
 *G06F 16/28* (2019.01)
 *G06Q 10/0631* (2023.01)

(52) U.S. Cl.
 CPC ..... *G06F 16/288* (2019.01); *G06Q 10/06312* (2013.01); *G06Q 10/06315* (2013.01); *G06Q 50/40* (2024.01)

(56) References Cited

U.S. PATENT DOCUMENTS

2018/0088576 A1* 3/2018 Kong .................. G05D 1/0212
2019/0039627 A1* 2/2019 Yamamoto ............ B60W 30/10
2019/0303806 A1* 10/2019 Namba .................. G06Q 10/02
2022/0120572 A9* 4/2022 Shoval ............... G01C 21/3492

FOREIGN PATENT DOCUMENTS

| | | | |
|---|---|---|---|
| JP | 2004185293 A | 7/2004 | |
| JP | 2006330964 A | 12/2006 | |
| JP | 2017182137 A | 10/2017 | |
| WO | WO-2016183525 A1 * | 11/2016 | ............ B60W 30/00 |

* cited by examiner

FIG.2

| Category | Device | Detection information | Continuation of driving plan is possible or not | Cause of change in driving plan |
|---|---|---|---|---|
| Detection information | Detection device (50) Onboard camera (51) Radar (52) | Construction information/ Accident information | Travel along first rout is not possible | Traffic restriction due to construction/accident |
| | | Congestion information | Travel along first rout is not possible | Congestion |
| Vehicle information | Sensor (60) | Traveling direction | Travel along first rout is not possible | Right or left turn is not possible |
| | | Vehicle speed | Delay | Congestion |
| | | Remaining energy | Required energy < Remaining energy | Remaining energy shortage |
| Vehicle diagnosis information | Vehicle diagnosis device (53) | Vehicle diagnosis information | Travel is not possible/ Arrival at destination is not possible | Trouble in vehicle |
| External information | ITS | Construction information/Accident information | Travel along first rout is not possible | Traffic restriction due to construction/accident |
| | Another vehicle | Congestion information | Travel along first rout is not possible | Congestion |

121

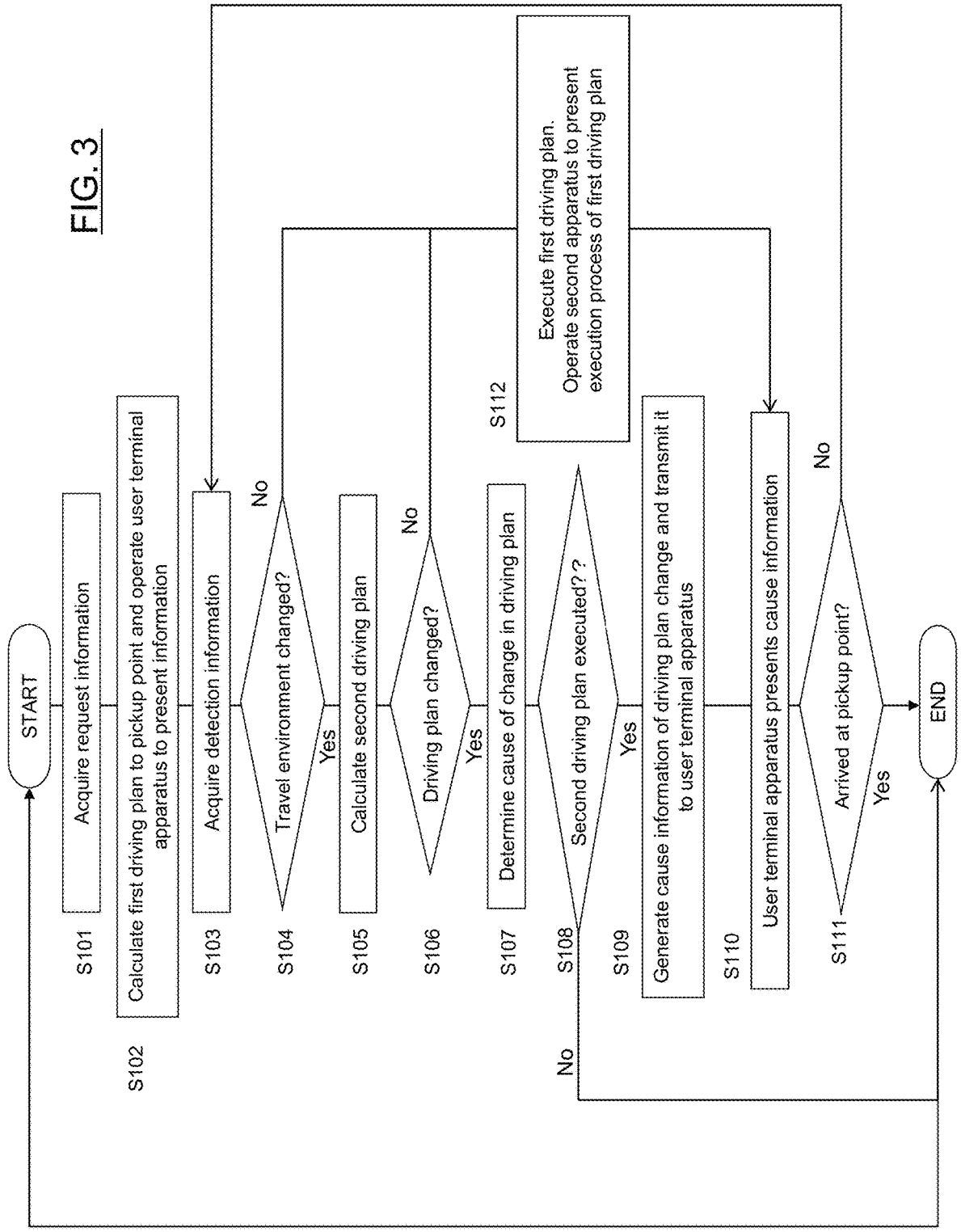

INFORMATION SERVICE METHOD FOR VEHICLE DISPATCH SYSTEM, VEHICLE DISPATCH SYSTEM, AND INFORMATION SERVICE DEVICE

TECHNICAL FIELD

The present invention relates to an information provision method for a vehicle allocation system, a vehicle allocation system, and an information provision apparatus.

BACKGROUND ART

A system for ride-sharing of a vehicle by a plurality of users is known, which is configured to display the travel route for a vehicle for the ride-sharing and the current position of the vehicle (Patent Document 1).

PRIOR ART DOCUMENT

Patent Document

[Patent Document 1] US2017/0169366A

SUMMARY OF INVENTION

Problems to be Solved by Invention

The user who has reserved a vehicle waits for the vehicle allocation under remote monitoring. However, to respond to an actual travel environment that changes from moment to moment, the driving plan may be changed by the determination made on the vehicle side. If the driving plan for the vehicle is suddenly changed, the movement of the vehicle also changes, and there is a problem in that the user who monitors the movement of the vehicle feels anxiety.

A problem to be solved by the present invention is to provide an information provision method, a vehicle allocation system, and an information provision apparatus that allow the user to wait for vehicle allocation in relief even when the driving plan for the vehicle is changed.

Means for Solving Problems

The present invention solves the above problem through calculating a first driving plan in response to request information, when a second driving plan different from the first driving plan is calculated based on acquired detection information, determining a cause of a change in the driving plan on the basis of the detection information, and presenting cause information including the cause.

Effect of Invention

According to the present invention, even when the first plan in response to the request information from a user is changed, the user is provided with the information on the cause of a change in the driving plan and can therefore wait for vehicle allocation in relief.

BRIEF DESCRIPTION OF DRAWINGS

FIG. 2 is a diagram illustrating an example of cause analysis information.

FIG. 3 is a chart illustrating an example of a control procedure executed in the vehicle allocation system including the information provision apparatus.

MODE(S) FOR CARRYING OUT THE INVENTION

Hereinafter, one or more embodiments of the present invention will be described with reference to the drawings. The embodiments will be described by exemplifying a case in which the information provision method/apparatus according to the present invention is applied to a vehicle allocation system.

Figure 1:
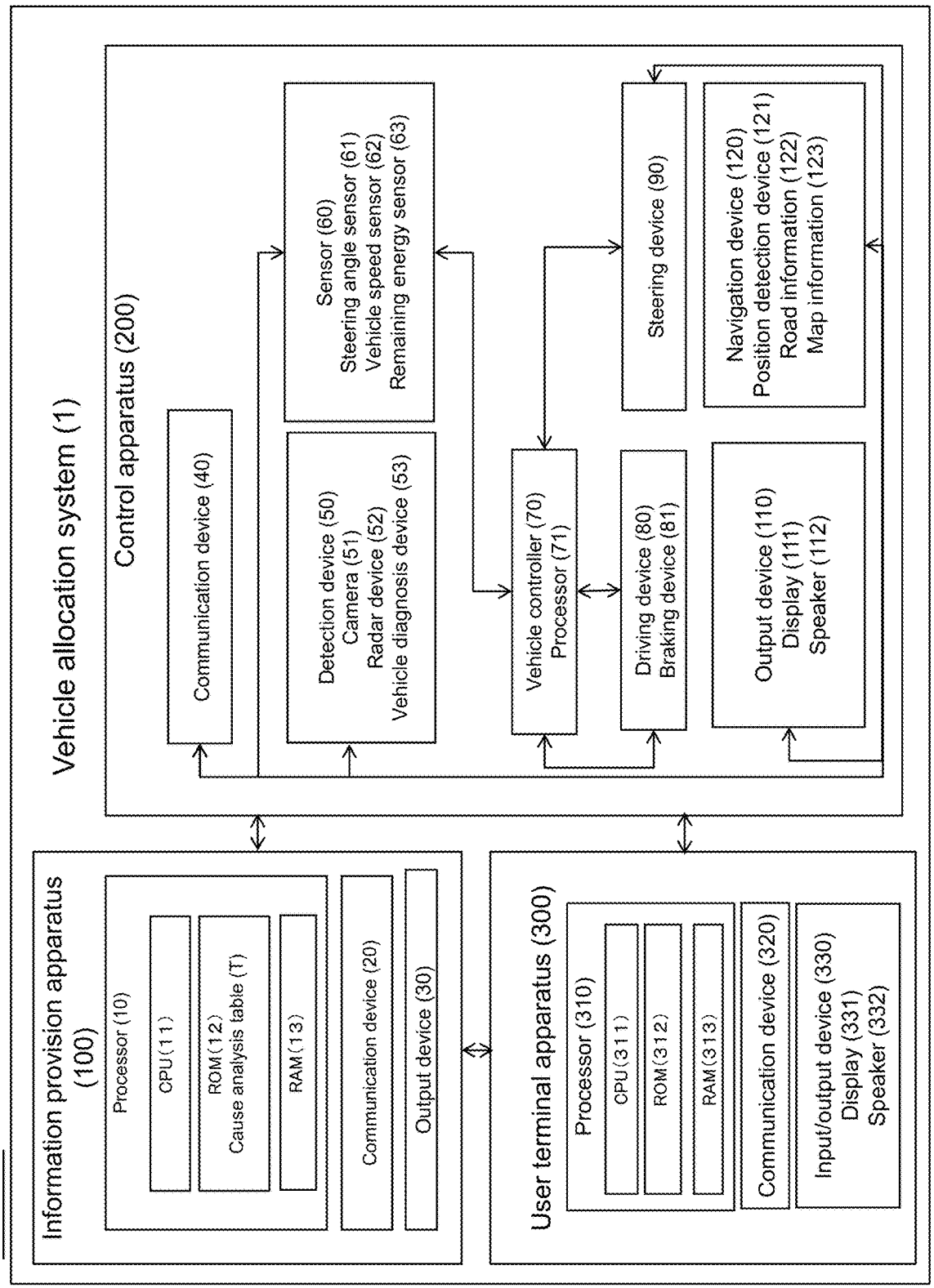
FIG. 1 is a block configuration diagram of a vehicle allocation system including an information provision apparatus according to one or more embodiments of the present invention.

FIG. 1 is a diagram illustrating the block configuration of a vehicle allocation system 1. The vehicle allocation system 1 according to one or more embodiments of the present invention includes an information provision apparatus 100, a control apparatus 200 of a vehicle, and a user terminal apparatus 300. Each apparatus includes a processor (computer) that executes a calculation process and a communication device. The information provision apparatus 100, the control apparatus 200 of a vehicle, and the user terminal apparatus 300 each have a communication function and exchange information with one another by wire communication or wireless communication.

In the vehicle allocation system 1 according to one or more embodiments of the present invention, the information provision apparatus 100 which serves as the first apparatus may be provided in the control apparatus 200 equipped in a vehicle or may also be provided in a separate server apparatus capable of communicating with the control apparatus 200 and the user terminal apparatus 300. The user terminal apparatus 300 which serves as the second apparatus can communicate with the control apparatus 200 and another user terminal apparatus 300 and exchanges information including request information, cause information, etc.

The information provision apparatus according to one or more embodiments of the present invention includes a processor 10, which includes a driving plan generation section, a cause information generation section, and a communication control section. The driving plan generation section executes a process of generating a first driving plan to be executed by the control apparatus of a vehicle, in response to request information from a user. The cause information generation section executes, when a second driving plan different from the first driving plan is generated based on detection information acquired from the vehicle and indicating a state of the vehicle, a process of generating cause information indicating the cause of a change in the driving plan on the basis of the detection information obtained from the vehicle. The communication control section executes a process of control of transmitting the cause information to the terminal apparatus of the user.

The user terminal apparatus 300 as the second apparatus includes at least a display 331. The display 331 is a touch panel-type display that has both an output (display) function and an input reception function. The display 331 includes a control device that receives an electronic command and operates the display 331 on the basis of the electronic command. The display 331 receives request information from a user in accordance with the electronic command. The display 331 executes an operation of presenting the cause information on the basis of a command from the information provision apparatus 100. The electronic command is generated by the information provision apparatus 100. The user terminal apparatus 300 receives the electronic command via a communication device 320 and controls the display 331 to present the cause information. The user terminal apparatus 300 may include a speaker (332). The user terminal apparatus 300 controls the speaker 332 to output the cause information in voice on the basis of the electronic command generated by the information provision apparatus 100.

The information provision method according to one or more embodiments of the present invention is carried out by the information provision apparatus 100. In one or more embodiments of the present invention as illustrated in FIG. 1, the information provision apparatus 100 is equipped in a vehicle together with the control apparatus 200. The information provision apparatus 100 may be equipped in a vehicle controller 70. The information provision apparatus 100 may be provided as an apparatus that is configured independently of the control apparatus 200 and the user terminal apparatus 300. In this case, the information provision apparatus 100 is configured on a network through which communication is possible with the control apparatus 200 of a vehicle and the user terminal apparatus 300. The information provision apparatus 100 is not limited in its form. The information provision apparatus 100 can be incorporated in the user terminal apparatus 300.

The vehicle according to one or more embodiments of the present invention has an autonomous travel function. The control apparatus 200 of a target vehicle controls the target vehicle to execute autonomous traveling. The target vehicle is allocated to be used by one or more users. The scheme of autonomous traveling is not particularly limited. The control apparatus 200 recognizes a lane in which the target vehicle (subject vehicle) is traveling, and controls the movement of the target vehicle so that the position of a lane marker of the lane and the position of the target vehicle maintain a predetermined relationship. The control apparatus 200 controls the movement of the target vehicle so that the distance along the road width direction from a lane marker of a lane for vehicles to travel to the target vehicle (i.e., the lateral position of the target vehicle) falls within a predetermined value range. The lane marker is not limited, provided that it has a function of defining a lane. Examples of the lane marker may include line figures drawn on a road surface, luminous bodies embedded in a road, plants existing between lanes, and road structures existing on the road shoulder side of a lane, such as guardrails, curbstones, sidewalks, and exclusive roads for two wheels. Examples of the lane marker may further include objects existing on the road shoulder side of a lane, such as advertising displays, signs, stores, and roadside trees.

As illustrated in FIG. 1, the control apparatus 200 of a vehicle according to one or more embodiments of the present invention includes a communication device 40, a detection device 50, a sensor 60, a vehicle controller 70, a driving device 80, a steering device 90, an output device 110, and a navigation device 120. These devices which constitute the control apparatus 200 are connected to one another via a controller area network (CAN) or other onboard LAN to mutually exchange information.

The detection device 50 detects the situation around the target vehicle. The detection device 50 detects the existence and existence position of a target object existing around the target vehicle. Although not particularly limited, the detection device 50 according to one or more embodiments of the present invention includes a camera 51. The camera 51 may be an infrared camera or a stereo camera. The camera 51 according to one or more embodiments of the present invention is, for example, an imaging device including an imaging element such as a CCD or a CMOS. The camera 51 is installed at a predetermined position of the target vehicle and captures images of target objects around the target vehicle. The term "around the target vehicle" as used herein encompasses the concepts of "ahead of the target vehicle," "behind the target vehicle," "sideways ahead of the target vehicle," and "sideways behind the target vehicle." The camera 51 may include a driving device that changes the imaging direction. Target objects to be imaged by the camera 51 include stationary objects such as signs and moving objects such as pedestrians and other vehicles. The signs include two-dimensional signs painted on a road surface and three-dimensional signs such as advertising displays.

The detection device 50 may analyze the image data to identify the type of a target object on the basis of the analysis result. The detection device 50 uses a pattern matching technique or the like to identify whether or not the target object included in the image data is a vehicle, a pedestrian (person), or a sign. Additionally or alternatively, the detection device 50 extracts the image of a target object from the image data and identifies a specific type of the target object (such as a four-wheel vehicle, a two-wheel vehicle, a bus, a truck, or a construction vehicle), a vehicle type (small car, large car), and a special-purpose vehicle (such as an emergency car or a wrecker vehicle) from the size and shape of the image and characteristic equipment in the image. The detection device 50 extracts the image of a pedestrian from the image data and identifies a specific type of the pedestrian (traffic control staff, police officer, ambulance staff) from the clothes (uniform) and equipment (helmet, uniform) in the image.

The detection device 50 determines that the position at which a construction vehicle is present is a construction site. The detection device 50 determines that the position at which a special-purpose vehicle is present is an accident site. The detection device 50 determines that the position at which a traffic control staff (pedestrian) is present is a construction site. The detection device 50 determines that the position at which a police officer or an ambulance staff (pedestrian) is present is an accident site.

Additionally or alternatively, the detection device 50 according to one or more embodiments of the present invention may use a radar device 52. Examples of the radar device 52 may be those, such as millimeter-wave radar, laser radar, and ultrasonic radar, which are known at the time of filing the present application. The detection device 50 processes the acquired measurement data to acquire the distance from the target vehicle to a target object existing around the target vehicle and/or the direction in which the target object exists with respect to the target vehicle, on the basis of the position of the target object. Schemes known at the time of filing the present application can be appropriately used for a process of deriving travel scene information based on the measurement data.

The detection device 50 determines the state of a string/platooning of other vehicles. The detection device 50 determines the spacing between other vehicles in the string/platooning and the direction in which the string/platooning of other vehicles extends on the right or left side of the target vehicle (subject vehicle) or ahead of the target vehicle (subject vehicle). The detection device 50 counts the number of other vehicles in the string/platooning. The detection device 50 determines the outlines of other vehicles in the captured image thereby to count the number of the other vehicles. The detection device 50 detects the front end of the string/platooning of other vehicle (the farthest position of the string/platooning which can be detected from the current position) on the basis of the reception signal acquired by the radar device 52 and calculates the number of other vehicles in the string/platooning to the front end position (the length of the string/platooning).

The detection device 50 uses the number of other vehicles and the length of the string/platooning of other vehicles as information indicating the degree of congestion. The congestion information is transmitted to the vehicle controller 70 of the target vehicle and used as information for determining whether to avoid the travel of the target vehicle.

In the automated (autonomous) driving, the vehicle controller 70 controls a vehicle to move along the route calculated by the navigation device 120. When the steering amount or the vehicle speed does not follow a control threshold that is set by the vehicle controller 70, the vehicle changes the driving plan. Examples of the change in the driving plan includes a change of a route, a change of a time of passing through each point, a change of a time of arriving at a destination (in this example, a point of picking a user up), and a change of the content of a driving command for a vehicle. For example, when the detection device 50 acquires information indicating that the number of other vehicles in a string/platooning or the length of a string/platooning of other vehicles is not less than a predetermined value in a right-turn lane of the route in the driving plan for the target vehicle, the vehicle controller 70 changes the route in the driving plan.

The above-described camera 51 and radar device 52 may be disposed outside the vehicle. For example, detection information acquired by a camera 51 and/or a radar device 52 provided on a road may be acquired via an external device of the intelligent transport system (ITS) or the like. The external device of the intelligent transport system or the like acquires traffic information including the speed of other vehicles, the length of a string/platooning of other vehicles (degree of congestion), the presence/absence/position of construction work, the presence/absence/position of an accident, etc. and provides the traffic information to the control apparatus 200 or the information provision apparatus 100.

The detection device 50 detects the state of the target vehicle. The detection device 50 confirms that the autonomous travel function of the target vehicle is functioning normally. Although not particularly limited, the detection device 50 according to one or more embodiments of the present invention includes a vehicle diagnosis device 53 that diagnoses by itself that the driving function of the subject vehicle is normal.

The sensor 60 according to one or more embodiments of the present invention includes a steering angle sensor 61, a vehicle speed sensor 62, and a remaining energy sensor 63. The steering angle sensor 61 detects a traveling direction based on steering information regarding the steering, such as the steering amount, steering speed, and steering acceleration of the target vehicle, and transmits the detected traveling direction to the information provision apparatus 100 via the vehicle controller 70 and the communication device 40. The vehicle speed sensor 62 detects a traveling speed (including zero when stopping) based on the traveling direction of the target vehicle, the vehicle speed/acceleration of the target vehicle, etc. and transmits the detected traveling speed to the information provision apparatus 100 via the vehicle controller 70 and the communication device 40. The remaining energy sensor 63 detects the remaining energy of the target vehicle. The remaining energy sensor 63 acquires the amount of energy required for the target vehicle to reach a pickup point after traveling along a first route calculated by the navigation device 120. The remaining energy sensor 63 confirms that the remaining energy of the target vehicle is larger than the energy required for the target vehicle to reach the pickup point, and outputs confirmation information. This confirmation process may be performed by the vehicle controller 70.

The vehicle controller 70 according to one or more embodiments of the present invention is an onboard computer such as an engine control unit (ECU) and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources. Examples of the electric car or hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the target vehicle. The drive mechanism includes an electric motor and/or an internal-combustion engine as the above-described traveling drive sources, a power transmission device including a drive shaft and an automatic transmission that transmit the output of the traveling drive sources to the drive wheels, and a braking device 81 that brakes the wheels. The driving device 80 generates respective control signals for these components of the drive mechanism and executes the travel control including acceleration/deceleration of the vehicle. These control signals for the drive mechanism are generated based on input signals by an accelerator operation and a brake operation and control signals acquired from the vehicle controller 70 or the information provision apparatus 100. Control information may be transmitted to the driving device 80, which can thereby perform the travel control including acceleration/deceleration of the vehicle in an automated or autonomous manner. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention includes a steering actuator. The steering actuator includes a motor and other necessary components attached to the steering column shaft. The steering device 90 executes the control of changing the traveling direction of the vehicle on the basis of a control signal acquired from the vehicle controller 70 or an input signal by the steering operation. The vehicle controller 70 transmits the control information including the steering amount to the steering device 90 thereby to execute the control of changing the traveling direction. The vehicle controller 70 includes one or more processors 71 that execute the process of automated driving (autonomous traveling).

The navigation device 120 includes a position detection device 121 and has road information 122 on the road type (right or left turn lane), road width, road shape, and others and map information 123 in which the road information 122 is associated with each point. On the basis of the current position of the target vehicle detected by the position detection device 121, the navigation device 120 specifies a route along which the target vehicle travels and a road link. The road information 122 according to one or more embodiments of the present invention is stored such than the information on the position of an intersection, the traveling direction in the intersection, and the type of the intersection and other information on the intersection are associated with identification information of each road link. The vehicle controller 70 controls the vehicle to move along the route (road link) calculated by the navigation device 120. The navigation device 120 transmits the route used for the automated driving to the information provision apparatus 100. The navigation device 120 sequentially transmits the current position of the target vehicle detected by the position detection device 121 to the information provision apparatus 100 at a predetermined cycle.

The navigation device 120 sets a route from the current position of the target vehicle to the destination and outputs the route information to the vehicle controller 70 via the output device 110, which will be described later. In one or more embodiments of the present invention, the destination is a pickup point that is designated in the request information which is input to the user terminal apparatus 300 by a user who desires vehicle allocation. On the basis of the command from the processor 10 of the information provision apparatus 100, the navigation device 120 calculates a first route from the current position to the designated pickup point. On the basis of a change in the travel environment based on the detection information, the vehicle controller 70 determines whether to change the first route. The determination of the change is transmitted to the navigation device 120 and the information provision apparatus 100. The navigation device 120 calculates a second route in accordance with a command of route change from the vehicle controller 70. The calculation result of the second route is transmitted to the vehicle controller 70, the information provision apparatus 100, and the user terminal apparatus 300. The communication with the user terminal apparatus 300 may be performed via the information provision apparatus 100. The user terminal apparatus 300 controls the display 331 to display the second route.

The output device 110 according to one or more embodiments of the present invention outputs information regarding the driving action based on a driving plan. As the information corresponding to the control information for controlling the target vehicle to travel along the target route, the information that the steering operation and/or acceleration/deceleration are to be executed is announced to occupants of the target vehicle or occupants of other vehicles via a display 111, a speaker 112, vehicle exterior lamps, and/or vehicle interior lamps. Additionally or alternatively, the output device 110 according to one or more embodiments of the present invention may output various information items regarding the travel assistance to an external device of the intelligent transport system (ITS) or the like via the communication device 40. The external device of the intelligent transport system or the like uses the information regarding the travel assistance, which includes the vehicle speed, steering information, travel route, etc., for the traffic management of a plurality of vehicles. The target vehicle can acquire the speed, steering information, and travel route of another vehicle via the external device.

The user terminal apparatus 300 will be described. The user terminal apparatus 300 is carried by the user who reserved the use of the target vehicle. The user terminal apparatus 300 is a small computer, such as a personal digital assistant (PDA) or a smartphone, which can be carried by the user. As illustrated in FIG. 1, the user terminal apparatus 300 includes a processor 310, a communication device 320, and an input/output device 330. The user terminal apparatus 300 exchanges information with the control apparatus 200 of a vehicle and/or the information provision apparatus 100 via the communication device 320. The user terminal apparatus 300 may be formed integrally with the information provision apparatus 100.

The input/output device 330 includes the display 331 and the speaker 332. The display 331 is a touch panel-type display. The display 331 receives the input of request information from the user. The request information includes identification information of the user, reservation date and time, information for specifying a reserved vehicle, information on a pickup point for boarding at which the use of the target vehicle is started, information on the use time, etc. The request information is transmitted to the information provision apparatus 100. The processor 310 of the second apparatus (user terminal apparatus 300) outputs the received cause information, which is transmitted from the control apparatus 200 of a vehicle, via the input/output device 330. The user can know the cause (reason) of a change in the driving plan from the cause information which is output from the input/output device 330.

The information provision apparatus 100 according to one or more embodiments of the present invention will be described below. The information provision apparatus 100, which serves as the first apparatus, exchanges information with the control apparatus 200 of a vehicle and with the user terminal apparatus 300 which serves as the second apparatus. The information provision apparatus 100 acquires detection information and information regarding the autonomous traveling from the control apparatus 200 of a vehicle and provides the cause information to the user terminal apparatus 300.

As illustrated in FIG. 1, the information provision apparatus 100 according to one or more embodiments of the present invention includes a processor 10, a communication device 20, and an output device 30. The communication device 20 exchanges information with the control apparatus 200 of a vehicle and/or the user terminal apparatus 300. The output device 30 outputs a command for controlling the previously described output device 110 of the control apparatus 200 of a vehicle to present the information including the cause information.

The processor 10 of the information provision apparatus 100 is a computer including a read only memory (ROM) 12 that stores programs for executing the travel control of the target vehicle, a central processing unit (CPU) 11 as an operation circuit that executes the programs stored in the ROM 12 to serve as the information provision apparatus 100, and a random access memory (RAM) 13 that serves as an accessible storage device.

The processor 10 of the information provision apparatus 100 according to one or more embodiments of the present invention has an information acquisition function, a function of determining a cause, a function of generating cause information, and an output function. The processor 10 according to one or more embodiments of the present invention executes each function by cooperation of software for achieving the above functions and the above-described hardware.

Each function of the information provision apparatus 100 according to one or more embodiments of the present invention will be described below.

The processor 10 acquires information that reflects a situation around the target vehicle via the communication device 20. The processor 10 acquires detection information from the detection device 50 and the sensor 60. The detection information includes an image captured by the camera 51, measurement information from the radar device 52, output information from the vehicle diagnosis device 53, and traffic information acquired from an external device (such as a device of the ITS). The detection information includes the steering amount from the steering angle sensor 61, the vehicle speed from the vehicle speed sensor 62, and the remaining energy from the remaining energy sensor 63.

The processor 10 calculates or acquires a first driving plan to be executed by the control apparatus 200 of a vehicle, in response to the request information input to the user terminal apparatus 300 (second apparatus). The process of calculating the first driving plan may be executed by the control apparatus 200 of a vehicle. The first driving plan includes a first route to the pickup point specified by the request information and a control instruction for controlling the target vehicle to travel along the first route. The first route is a route to the pickup point calculated when the request information is acquired. The first route is calculated based on the detection information, road information 122, and map information 123 which are acquired at the timing at which the request information is acquired. The first route is calculated when the vehicle allocation process is started. The first driving plan is calculated based on the calculated first route.

After the calculation of the first driving plan, the process of executing the control instruction for the first driving plan is started. When the execution of the first driving plan is started, the target vehicle starts moving. After the movement of the target vehicle is started, the travel environment for the target vehicle changes from moment to moment. The detection device 50 continues a process of detecting the information regarding the travel environment and a process of transmitting the detection result at a predetermined cycle. Depending on the travel environment after being changed, execution of the scheduled first driving plan may be interrupted. For example, if the first route and the first driving plan are calculated based on information that has not occurred, information that has occurred but cannot be detected, or information that has occurred but is not reflected in the road information 122 and the map information 123 and thereafter the information occurring, the information detected, or the information reflected in the road information 122 and/or the map information 123 is newly acquired, it may be difficult to execute the first driving plan along the first route. If information on congestion due to traffic concentration, traffic prohibition due to an accident, traffic restriction due to construction, malfunction of a vehicle, etc. is acquired after a change in the travel environment, for example, after calculating the first driving plan, the processor 10 may determine that the execution of the first driving plan cannot be continued. If the movement along the first route is not possible, the estimated time of arrival at points including the pickup point is delayed, or the vehicle cannot be used, the processor 10 determines that the initially scheduled first driving plan cannot be continued. In this case, the processor 10 executes calculation of a new second route and a new second driving plan. The vehicle controller 70 may be made to perform the process of determining whether or not the first driving plan can be continued.

When a determination is made that the execution of the first driving plan cannot be continued, the processor 10 acquires information as to whether or not a second driving plan different from the first driving plan is calculated based on the detection information which is newly acquired by the detection device 50. When the target vehicle cannot travel along the first route, the processor 10 calculates a second route different from the first route and also calculates a second driving plan including the second route. The processor 10 may operate the vehicle controller 70 to calculate the second route and calculate the second driving plan including the second route.

When the control apparatus 200 of a vehicle determines that the vehicle cannot arrive at the pickup point at a first estimated time of arrival that is preliminarily calculated, on the basis of the detection information which is newly acquired by the detection device 50, the processor 10 acquires information as to whether or not a second estimated time of arrival different from the first estimated time of arrival is calculated. When the target vehicle cannot arrive at the pickup point at the first estimated time of arrival, the processor 10 calculates a second estimated time of arrival different from the first estimated time of arrival and also calculates a second driving plan including the second estimated time of arrival. The processor 10 may operate the vehicle controller 70 to calculate the second estimated time of arrival and the second driving plan including the second estimated time of arrival.

When the control apparatus 200 of a vehicle determines that a first vehicle that is specified in the request information cannot be used, on the basis of the detection information which is newly acquired by the detection device 50, the processor 10 acquires information as to whether or not a second vehicle different from the first vehicle is specified. When the occurrence of malfunction of the first vehicle or the energy shortage of the first vehicle is detected, users cannot use the first vehicle. The malfunction of the first vehicle is determined based on the output information from the vehicle diagnosis device 53. The energy shortage of the first vehicle is determined based on the output information from the remaining energy sensor 63. When the first vehicle cannot be used by the user, the processor 10 specifies a second vehicle different from the first vehicle. The processor 10 specifies, instead of the first vehicle, a second vehicle that is located at a position closest to the position of the first vehicle. The processor 10 specifies, instead of the first vehicle, a second vehicle that is located at a position closest to the pickup point/a position from which the pickup point can be reached in the shortest time. The processor 10 calculates a second driving plan including second specifying information for the newly specified second vehicle. The processor 10 may operates the vehicle controller 70 to specify the second vehicle and calculate the second driving plan including the second specifying information for specifying the second vehicle.

When the second driving plan different from the first driving plan is calculated, the processor 10 determines the cause of a change in the driving plan on the basis of the detection information acquired by the control apparatus 200. The cause of a change in the driving plan is determined by the onboard control apparatus 200. The control apparatus 200 determines the cause of a change in the driving plan on the basis of the detection information at the time point at which the second driving plan is calculated. The detection information changed at the time point at which the second driving plan is calculated may be determined as the cause of a change in the driving plan.

Schemes of determining a cause will be exemplified below.

(1) When the number of other vehicles in a string/platooning located ahead (or ahead on the right or left) or the length of the string/platooning exceeds a predetermined value at the timing at which the second driving plan is calculated, the processor 10 determines that the cause of a change in the driving plan is "congestion." The processor 10 calculates the number of other vehicles in a string/platooning or the length of the string/platooning on the basis of the captured image.

(2) When the image captured ahead (or ahead on the right or left) includes a construction vehicle and/or a characteristic pedestrian (traffic control staff) at the timing at which the second driving plan is calculated, the processor 10 determines that the cause of a change in the driving plan is "construction." The processor 10 determines the cause with reference to correspondence information in which the feature of the detection information is associated with each cause. In the correspondence information, the cause "construction" is associated with the image feature of a construction vehicle and the image feature of clothes (uniform)/belongings (guidance light for traffic control) of a traffic control staff. When the captured image includes a feature associated with the cause "construction," the processor 10 determines that the cause of a change in the driving plan is "construction."

(3) When the image captured ahead (or ahead on the right or left) includes a special-purpose vehicle (police vehicle, ambulance vehicle, a wrecker vehicle) and/or a characteristic operator (police officer, ambulance staff) at the timing at which the second driving plan is calculated, the processor 10 determines that the cause of a change in the driving plan is an "accident." The processor 10 determines the cause with reference to correspondence information in which the feature of the detection information is associated with each cause. In the correspondence information, the cause "accident" is associated with the image feature of a special-purpose vehicle and the image feature of clothes (uniform/cap)/belongings (equipment) of a police officer, an ambulance staff, or the like. When the captured image includes a feature associated with the cause "accident," the processor 10 determines that the cause of a change in the driving plan is an "accident."

(4) When the actual vehicle speed is lower than the vehicle speed at a certain point defined in the first driving plan by a predetermined value or more at the timing at which the second driving plan is calculated, the processor 10 determines that the cause of a change in the driving plan is "congestion." When a vehicle cannot move at the speed expected in the first driving plan, the processor determines that the vehicle cannot move at the expected speed due to the congestion on the first route. An average vehicle speed in a certain travel range may be used as the vehicle speed.

(5) When the actual steering amount is lower than the steering amount at a certain point defined in the first driving plan by a predetermined value or more at the timing at which the second driving plan is calculated, the processor 10 determines that the cause of a change in the driving plan is "congestion." When the target vehicle cannot move along the first route, that is, when the target vehicle moves straight ahead at a point at which the target vehicle should turn right or left, the processor determines that the vehicle cannot turn right or left due to the congestion in the right or left turn lane.

(6) When there is an output indicating malfunction in the vehicle diagnosis information at the timing at which the second driving plan is calculated, the processor 10 determines that the cause of a change in the driving plan is "malfunction of the target vehicle." When the first vehicle specified in the first driving plan is changed, the processor determines that the specified first vehicle cannot be allocated due to a trouble in the first vehicle.

(7) When there is an output of remaining energy shortage information at the timing at which the second driving plan is calculated, the processor 10 determines that the cause of a change in the driving plan is "remaining energy shortage of the target vehicle." When the first vehicle specified in the first driving plan is changed, the processor determines that the first vehicle cannot reach the destination with the remaining energy from the pickup point specified in the request information, that is, the specified first vehicle cannot be allocated due to the "energy shortage."

(8) When the actual vehicle speed of the target vehicle or the string/platooning of vehicles including the target vehicle acquired from an external device or another vehicle is lower than the vehicle speed at a certain point defined in the first driving plan by a predetermined value or more at the timing at which the second driving plan is calculated, the processor 10 determines that the cause of a change in the driving plan is "congestion." When the target vehicle cannot move at the speed expected in the first driving plan, the processor determines that the target vehicle cannot move at the expected speed due to the congestion on the first route.

(9) When the number of other vehicles in a string/platooning located ahead of the target vehicle (or ahead of the target vehicle on the right or left) or the length of the string/platooning acquired from an external device such as a device of the ITS or from another vehicle exceeds a predetermined value at the timing at which the second driving plan is calculated, the processor 10 determines that the cause of a change in the driving plan is "congestion." When congestion information acquired from an external device such as a device of the ITS exceeds a predetermined evaluation value at the timing at which the second driving plan is calculated, the processor 10 determines that the cause of a change in the driving plan is "congestion."

(10) When construction information/accident information is acquired from an external device such as a device of the ITS or from another vehicle at the timing at which the second driving plan is calculated, the processor 10 determines that the cause of a change in the driving plan is "construction" or an "accident."

The determined cause of a change in the driving plan is transmitted to the user terminal apparatus 300 which serves as the second apparatus.

The user can confirm the cause of a change in the driving plan, which is output by the user terminal apparatus 300, thereby to know the cause of a change in the driving plan, such as a change in the route, a change in the time of arrival at the pickup point, or a change of the vehicle. The user can therefore wait for the arrival of a vehicle to be allocated without feeling anxiety.

In particular, when the vehicle moves to the pickup point by autonomous traveling, the user confirms that the vehicle allocation process is being properly executed, from the change over time of the route for the vehicle. This is because no driver is in the vehicle and it is not expected that a delay due to congestion or selection of a detour route will be reported. In the vehicle allocation system 1 according to one or more embodiments of the present invention, the cause of a change in the driving plan for a vehicle is presented to the user; therefore, the user can understand the movement of the vehicle in accordance with the cause and wait for the arrival of the vehicle without feeling anxiety. The cause of a change in the driving plan is automatically presented to the user, and it is thus not necessary for a center or the like to constantly manage the position, route, and delay of a vehicle that is traveling in an autonomous manner. The processing cost in the vehicle allocation system 1 can be reduced.

Moreover, when the progress information of the driving plan for a vehicle to be allocated based on the request information is sequentially displayed on the user terminal apparatus 300, that is, when the route and current position of the vehicle are sequentially displayed on the user terminal apparatus 300, the user can confirm over time a state in which the vehicle is moving toward the pickup point. As the vehicle approaches the pickup point over time, the user can estimate the arrival of the vehicle. However, if the driving plan for a vehicle is changed due to a change in the travel environment and the vehicle shows a movement away from the pickup point at least temporarily, the user feels anxiety that the request made by the user may not be executed.

In such a case, according to one or more embodiments of the present invention, the cause of a change in the driving plan is presented. This presentation of information allows the user to understand the reason of a change in the movement of the vehicle before feeling anxiety. The user who is preliminarily notified of the cause of a change in the driving plan can evenly receive a change of the route, a delay of the arrival time, and a change of the vehicle.

Additionally or alternatively, the information provision apparatus 100 may preliminarily store a cause analysis table T in which the detection information and the cause of a change in the driving plan are associated with each other in advance. The processor 10 refers to the cause analysis table T to determine the cause of calculation of the second driving plan on the basis of the acquired detection information. By preparing the cause analysis table T in advance, it is possible to promptly determine an accurate cause.

FIG. 2 illustrates an example of the cause analysis table T. Examples of schemes for determining the cause of a change in the driving plan will be described below with reference to the cause analysis table T.

(1) In the cause analysis table T, the detection information (construction information/accident information or congestion information) obtained when the driving plan is changed and the cause of a change in the driving plan (traffic restriction due to construction/accident or congestion) are associated with each other. The processor 10 acquires the detection information from the detection device 50. The detection information includes an image captured by the camera 51 and detection information obtained from measurement information from the radar device 52. The processor 10 acquires the construction information or the accident information from the detection information. The processor 10 acquires the congestion information from the detection information. The processor 10 determines whether or not the travel along the first route can be continued. This determination may be executed by the vehicle controller 70. When the travel along the first route cannot be continued, a second route is calculated. Provided that the travel along the first route cannot be continued and the second route is calculated, when the construction information or the accident information is detected, the processor 10 determines that the cause of a change in the driving plan is construction or an accident. Provided that the travel along the first route cannot be continued and the second route is calculated, when the congestion information is detected, the processor 10 determines that the cause of a change in the driving plan is congestion.

(2) In the cause analysis table T, the detection information (traveling direction/vehicle speed/remaining energy) obtained when the driving plan is changed and the cause of a change in the driving plan (unable to turn right or left/congestion/remaining energy shortage) are associated with each other. The processor 10 acquires the detection information from the sensor 60. The detection information includes the steering amount from the steering angle sensor 61, the vehicle speed from the vehicle speed sensor 62, and the remaining energy from the remaining energy sensor 63. The processor 10 acquires the traveling direction, vehicle speed, or remaining energy from the detection information. The processor 10 determines whether or not the first driving plan can be executed. This determination may be executed by the vehicle controller 70.

(2-1) When the travel along the first route cannot be continued, a second route is calculated. Provided that the vehicle cannot turn right or left along the first route and the second route is calculated, when it is detected that the right or left turn is not possible, the processor 10 determines that the cause of a change in the driving plan is "being unable to turn right or left."

(2-2) When the first estimated time of arrival at the pickup point designated in the request information is delayed by a predetermined time or more, a new second driving plan is calculated. When the first vehicle speed at a predetermined point defined in the first driving plan is lower than a predetermined vehicle speed by a predetermined value or more and the arrival at the pickup point is delayed, the processor 10 determines that the cause of a change in the driving plan is "congestion."

(2-3) When the remaining energy is less than the energy required to reach the destination of the user via the pickup point, a second vehicle different from the first vehicle specified in the request information is allocated. Provided that the vehicle to be allocated is changed, when a determination is made that the remaining energy is insufficient, the processor 10 determines that the cause of a change in the driving plan is "remaining energy shortage."

(3) In the cause analysis table T, the detection information (vehicle diagnosis information) obtained when the driving plan is changed and the cause of a change in the driving plan (trouble in the vehicle) are associated with each other. The processor 10 acquires the output information from the vehicle diagnosis device 53. The detection information includes an output signal from the vehicle diagnosis device 53. The processor 10 extracts the state of the vehicle from the detection information (vehicle diagnosis information). Provided that the vehicle to be allocated is changed, when a trouble in the vehicle is determined, the processor 10 determines that the cause of a change in the driving plan is a "trouble in the vehicle."

(4) In the cause analysis table T, the detection information (construction information/accident information or congestion information) obtained from an external device when the driving plan is changed and the cause of a change in the driving plan (traffic restriction due to construction/accident or congestion) are associated with each other. The processor 10 acquires the detection information from a detection device 50 provided in the external device. The detection information includes an image captured by a camera 51 of the external device (such as a device of the ITS), detection information obtained from measurement information from a radar device 52, and traffic information (including congestion information, accident information, and construction information). The processor 10 extracts the construction information or the accident information from the detection information. The processor 10 extracts the congestion information from the detection information from the external device. The processor 10 determines whether or not the travel along the first route can be continued. This determination may be executed by the vehicle controller 70. When the travel along the first route cannot be continued, a second route different from the first route is calculated. Provided that the travel along the first route cannot be continued and the second route is calculated, when the construction information or the accident information is detected, the processor 10 determines that the cause of a change in the driving plan is "construction" or an "accident." Provided that the travel along the first route cannot be continued and the second route is calculated, when the congestion information is detected, the processor 10 determines that the cause of a change in the driving plan is "congestion."

On the basis of the acquired detection information, the processor 10 of the information provision apparatus 100 acquires, as the change timing of the driving plan, the timing at which the second driving plan different from the first driving plan created based on the request information is calculated. When acquiring the change timing of the driving plan, the processor 10 determines the cause of a change in the driving plan on the basis of the detection information acquired by the control apparatus 200. The cause of a change in the driving plan is determined based on the detection information acquired at the timing at which the second driving plan is calculated; therefore, the detection information to be used for the determination of the cause is appropriately narrowed down and the cause can thus be accurately determined.

The processor 10 of the information provision apparatus 100 acquires the timing at which the route is changed, as the change timing of the driving plan. The change timing is the timing at which the driving along the first driving plan including the first route is changed to the driving along the second driving plan including the second route. On the basis of the detection information acquired by the control apparatus 200 of a vehicle that is driven along the first driving plan including the first route, the processor 10 calculates, as the change timing, the timing at which the second driving plan including the second route different from the first route is calculated.

The processor 10 determines the cause of a change in the driving plan at the timing at which the route included in the driving plan is changed. The cause determined at this timing is the cause of the route change. This cause of a change in the driving plan is announced to the user. The user can know the cause that the route for a vehicle reserved by the user is changed; therefore, even when the vehicle does not approach the pickup point along the shortest route, such as when the vehicle travels in a direction away from the pickup point, the user can wait for the arrival of the vehicle without feeling anxiety.

The processor 10 of the information provision apparatus 100 acquires the timing at which the first estimated time of arrival at the pickup point is changed, as the change timing of the driving plan. The change timing is the timing at which the second driving plan is calculated. The second driving plan includes the second estimated time of arrival later than the first estimated time of arrival by a predetermined time or more. On the basis of the detection information acquired by the control apparatus of the vehicle which is driven along the first driving plan including the first estimated time of arrival at the pickup point designated in the request information, the processor 10 acquires the timing at which the second driving plan is calculated, as the change timing. Again, the second driving plan includes the second estimated time of arrival later than the first estimated time of arrival by a predetermined time or more.

The processor 10 determines the cause of a change in the driving plan at the timing at which the time of arrival at the pickup point included in the driving plan is changed. The cause determined at this timing is the cause that the time of arrival is delayed. This cause of a change in the driving plan is announced to the user. The user can know the cause that the arrival time of a vehicle reserved by the user is delayed; therefore, even when the vehicle does not arrive at the pickup point at the estimated time, such as when the vehicle approaches the pickup point at a lowered speed, the user can wait for the arrival of the vehicle without feeling anxiety.

The processor 10 of the information provision apparatus 100 acquires the timing at which the vehicle to be allocated to the pickup point is changed, as the change timing of the driving plan. The change timing is the timing at which the second driving plan including the allocation of a second vehicle is calculated. The second vehicle is a vehicle other than the first vehicle designated in the request information. On the basis of the detection information acquired by the control apparatus 200 of the first vehicle which is driven along the first driving plan including first specifying information for specifying the first vehicle designated in the request information, the processor 10 acquires the timing at which the second driving plan is calculated, as the change timing. The second driving plan includes second specifying information for specifying the second vehicle different from the first vehicle.

The processor 10 determines the cause of a change in the driving plan at the timing at which a determination is made that the first vehicle designated by the user in the request information cannot be allocated and the vehicle to be allocated is changed from the first vehicle to the second vehicle. The change in the detection information acquired at the timing of the change in the driving plan is highly likely to be the cause of a change in the driving plan. The processor 10 of the information provision apparatus 100 generates cause information at the timing at which a new driving plan is calculated. The cause determined at the timing of calculating the new driving plan is highly probable to be the cause that the vehicle is changed. Thus, by limiting the timing for determining the cause, it is possible to determine an accurate cause.

The cause information of a change in the driving plan is announced to the user. The processor 10 transmits the cause information to the user terminal apparatus 300 as the second apparatus at the timing at which the execution of the second driving plan is started instead of the first driving plan. Even when a new driving plan is calculated, it may not be actually executed. In one or more embodiments of the present invention, the cause information is transmitted to the user terminal apparatus 300 at the timing at which the driving control for the target vehicle along the first driving plan is canceled and the driving control for the target vehicle along the newly calculated second driving plan is actually started. Information on the start of the driving control based on the second driving plan may be acquired from the vehicle controller 70.

The user knows the change in the route, position, and time of arrival of the target vehicle after the driving control based on the second driving plan is started in the target vehicle. When the driving plan is changed, the cause information has already been presented to the user, and the user is therefore to understand the cause and then know the change in the movement of the target vehicle (change in the route, position, or arrival time). Accordingly, the user does not feel anxiety even when observing the change in the movement of the target vehicle (change in the route, position, or arrival time). Moreover, even when a new driving plan is calculated, it may not be actually executed. The cause information is presented to the user at the timing at which the driving control based on the new driving plan is actually started, and the user can therefore be prevented from being presented with the cause of the change to the new driving plan which is not actually executed. This can prevent the user from being presented with unnecessary information, and useful information for the user can be presented in a timely manner.

The processor 10 of the information provision apparatus 100 generates the cause information in which the content of the cause of a change in the driving plan is expressed in text, and transmits the generated cause information to the user terminal apparatus 300. The cause of a change in the driving plan is expressed by text information and can therefore be accurately conveyed to the user. The cause information may include not only the "cause" itself but also those which can be classified into a state (temporary stop/not allowed to change lanes/closed traffic/route change), those which can be classified into a result (delay/stop), and countermeasures (detour). Examples of the cause information include, but are not limited to, "Lane change was not possible," "Lane change was not possible due to congestion." "It takes time to arrive due to congestion." "Traffic is congested. Another route will be used to avoid congestion." "Traffic is restricted due to construction. Another route will be used." "Traffic is closed due to an accident. Another route will be used." and "Vehicle will make a stop to allow an ambulance vehicle to pass."

The processor 10 of the information provision apparatus 100 generates the cause information in which the content of the cause of a change in the driving plan is expressed by an image, and transmits the generated cause information to the user terminal apparatus 300. The cause of a change in the driving plan is expressed by an image and the state can therefore be accurately conveyed to the user. Moreover, the user can visually understand the state and the degree of the state through the image. For example, an image captured by the onboard camera 51 may be presented as the cause information. The degree of congestion can be appropriately conveyed to the user through the captured image.

The processor 10 of the information provision apparatus 100 may generate the cause information including both the text and the image. The text can accurately convey the cause and the image can accurately convey the degree of the cause.

The cause information is transmitted to the user terminal apparatus 300. The user terminal apparatus 300 presents the cause information.

The control procedure executed in the vehicle allocation system 1 including the information provision apparatus 100 according to one or more embodiments of the present invention will be described with reference to the flowchart of FIG. 3.

In step S101, the processor 10 of the information provision apparatus 100 acquires the request information which is input to the user terminal apparatus 300 (second apparatus).

In step S102, the processor 10 calculates the first driving plan to be executed by the control apparatus of a vehicle, in response to the input request information. The first driving plan includes the first route from the current position of the target vehicle to be allocated to the pickup point designated in the request information. The first driving plan includes the specifying information for the first vehicle (target vehicle) designated in the request information. The first driving plan includes the first estimated time of arrival at the pickup point designated in the request information. The processor 10 may operate the vehicle controller 70 to calculate the first driving plan.

Figure 4:
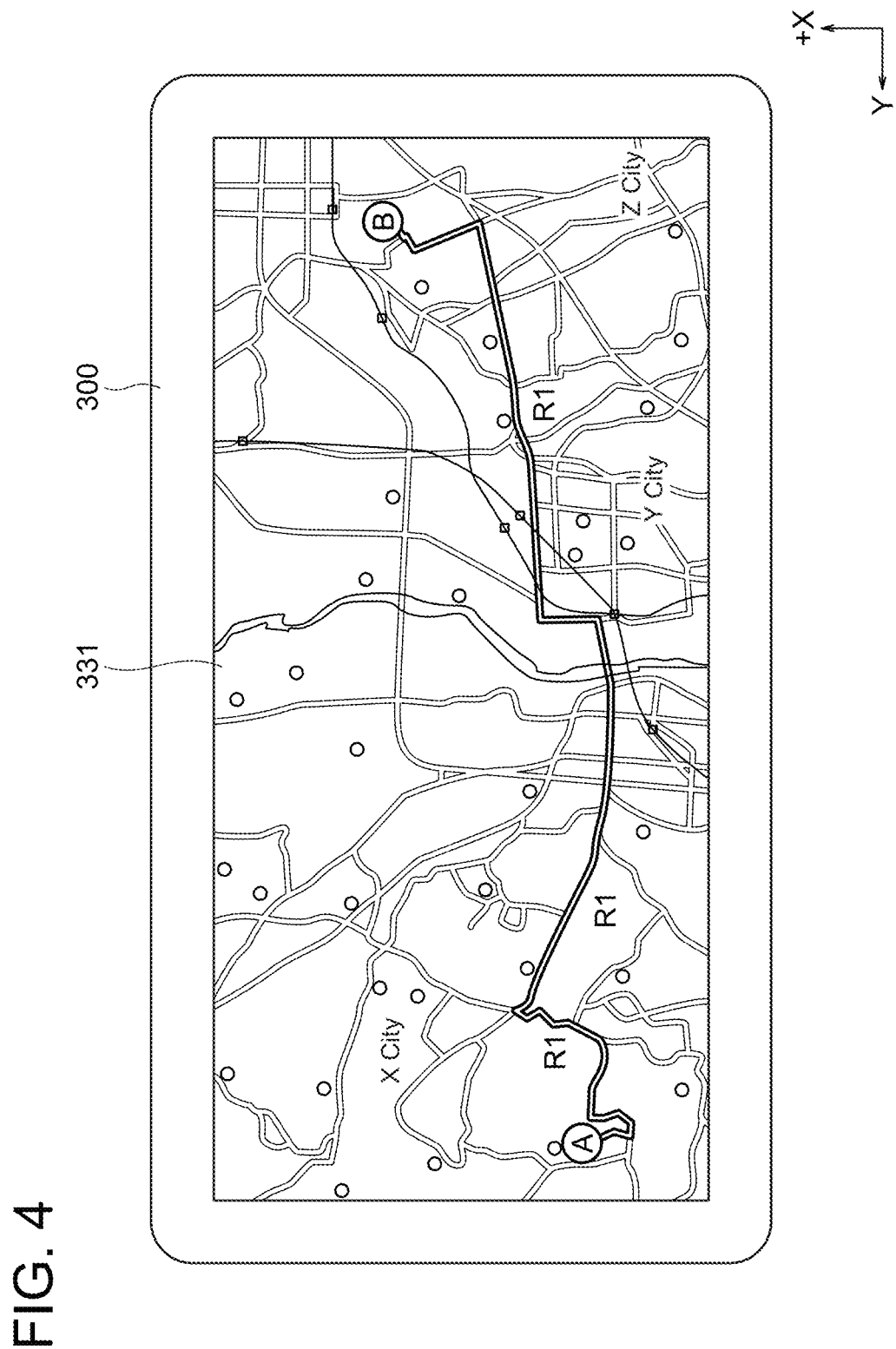
FIG. 4 is a diagram illustrating an example of a first route in a first driving plan.

FIG. 4 illustrates an example of the first route. First route R1 is a planned travel route from a current position A of the first vehicle to a pickup point B and is indicated by a thick line. Information on the first route R1 is displayed on the display 331 of the user terminal apparatus 300, which is carried by the user, so as to be superimposed on the map information 123. The map information 123 may be provided from the navigation device 120, may be stored in the user terminal apparatus 300, or may be downloaded from an external device.

In step S103, the processor 10 acquires the detection information obtained by the control apparatus 200 of the target vehicle. The detection information is information regarding the travel environment acquired from the detection device 50, the sensor 60, and/or an external device which is not illustrated.

In step S104, the processor 10 determines whether or not there is a change in the travel environment on the basis of the detection information. When a predetermined difference is calculated/determined between the detection information when the first driving plan is calculated and the newly obtained detection information, a determination is made that there is a change in the travel environment. This change in the travel environment may be determined for each point on the first route in the first driving plan. In the first driving plan, for example, a point X is defined with an expected vehicle speed P/expected time of passage T/right turn (steering amount K). With reference to the definition, when a predetermined difference is calculated in a vehicle speed P'/time of passage T'/right turn (steering amount K') at the time at which the target vehicle travels through the point X, the processor 10 determines that there is a change in the travel environment.

When a determination is made that there is a change in the travel environment, the process proceeds to step S105, while when a determination is made that there is not a change in the travel environment (the travel environment is as expected in the first driving plan), the process proceeds to step S112. In step S112, the control apparatus 200 is instructed to execute the first driving plan and controls the vehicle to move along the first route.

Figure 5:
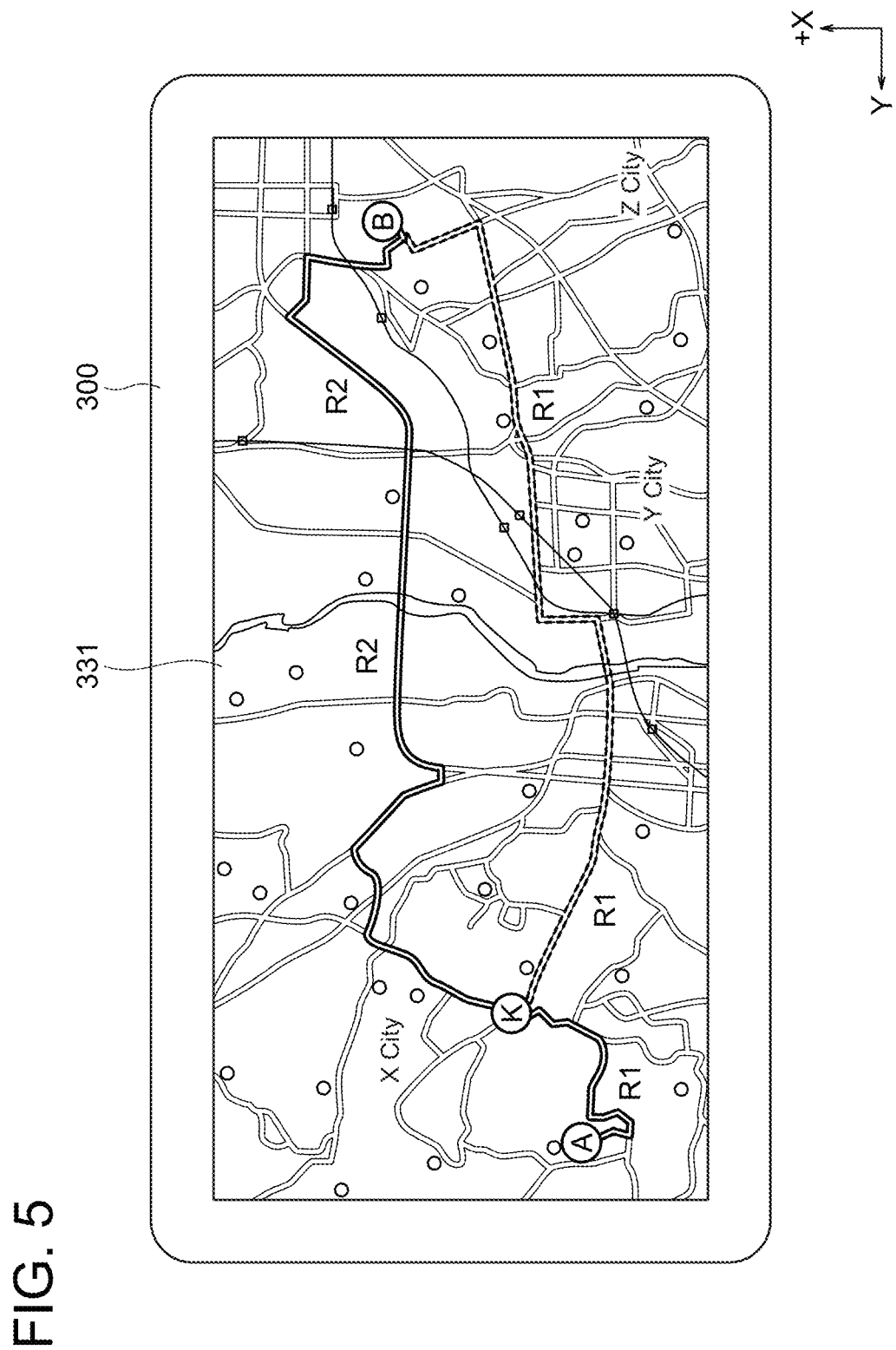
FIG. 5 is a diagram illustrating an example of a second route in a second driving plan.

In step S105, the processor 10 calculates a second driving plan different from the first driving plan in accordance with a change in the travel environment. The processor 10 may operate the vehicle controller 70 to calculate the second driving plan. The second driving plan in this example includes a second route R2 different from the first route R1. FIG. 5 illustrates an example of the second route R2. Unlike the first route R1 for turning right at an intersection K, the second route R2 is a route for moving straight ahead.

Figure 6A:
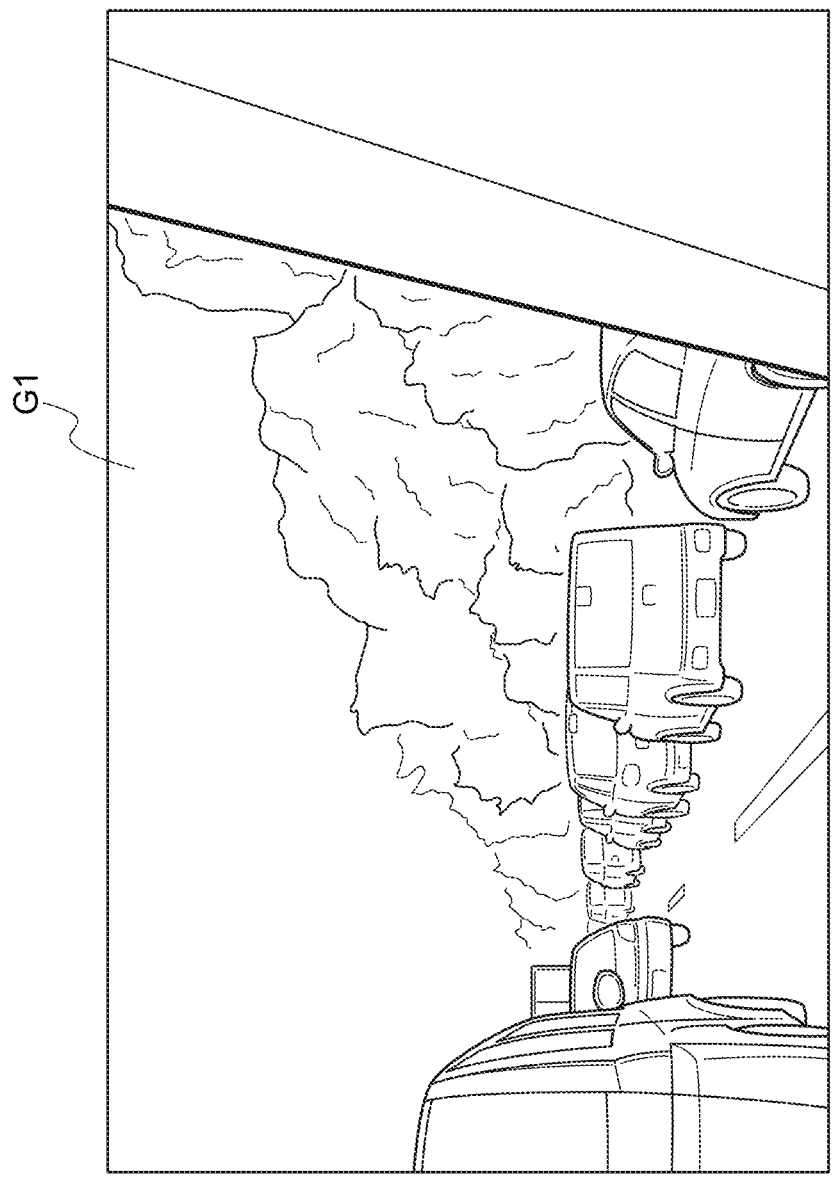
FIG. 6A is a diagram illustrating an example of detection information.

An example of a first cause that the second route R2 is calculated will be described. Initially, the first route R1 was calculated based on the received request information and the vehicle was controlled to move along the first route R1. However, at the point K at which the vehicle was to be controlled to turn right in the first driving plan, the right-turn lane was congested and the vehicle was not able to enter the right-turn lane (change lanes). FIG. 6A illustrates a captured image G1 indicating the congestion in the right-turn lane. In the right-turn lane, the length of a string/platooning of vehicles is long, the inter-vehicle distance is short, and there is no area for the target vehicle to enter. The processor 10 (or the vehicle controller 70) therefore determines that the vehicle cannot enter the right-turn lane, and calculates a new second route R2 on the basis of the change in the travel environment.

Figure 6B:
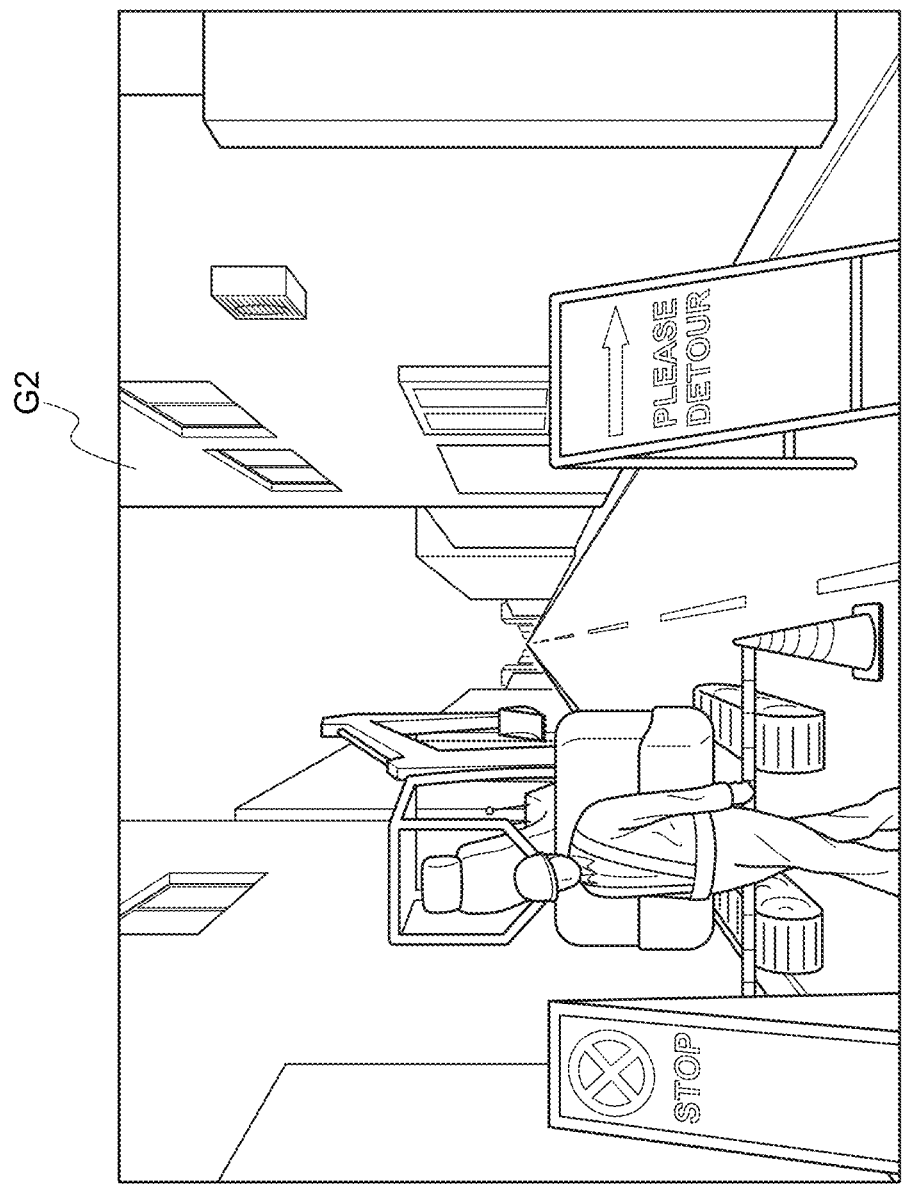
FIG. 6B is a diagram illustrating another example of detection information.

An example of a second cause that the second route R2 is calculated will be described. Initially, the first route R1 was calculated based on the received request information and the vehicle was controlled to move along the first route R1. However, at the point K at which the vehicle was to be controlled to turn right in the first driving plan, the road for the vehicle to enter was under construction and the vehicle was not able to enter the road. FIG. 6B illustrates a captured image G2 indicating that the road expected for the vehicle to enter is under construction. There are a special-purpose vehicle for road construction and a traffic management person (pedestrian). In addition, signboards indicating the closed traffic are also disposed. The processor 10 (or the vehicle controller 70) determines from the image information that this road is under construction and the vehicle cannot enter the road. The processor 10 (or the vehicle controller 70) therefore determines that the vehicle cannot enter the road on the right side, and calculates a new second route R2 on the basis of the change in the travel environment.

In step S106, the processor 10 confirms a change in the driving plan. That is, the processor 10 confirms that the newly calculated second driving plan is different from the previously executed first driving plan. When a determination is made that the newly calculated driving plan is the same as (or approximate to) the previously executed first driving plan, the process proceeds to step S112, in which the execution of the first driving plan is continued.

On the other hand, when a determination is made that the second driving plan is different from the first driving plan, the process proceeds to step S107. The determination as to whether or not the first driving plan and the second driving plan are different from each other is made based on the difference in the detection information at each point. For example, when the positions of the first route and second route are separated by a predetermined distance or more, a determination is made that the first driving plan and the second driving plan are different. For example, when a difference of a predetermined time or more occurs between the first estimated time of arrival and the second estimated time of arrival at a certain point, a determination is made that the first driving plan and the second driving plan are different. When the identification information of the first vehicle expected to be allocated and the identification information of the second vehicle are different, a determination is made that the first driving plan and the second driving plan are different.

In step S107, the processor 10 determines the cause of a change in the driving plan. The processor 10 determines the cause on the basis of the detection information acquired when the driving plan is changed. The processor 10 determines the cause on the basis of the difference between the detection information acquired before the driving plan is changed and the detection information acquired after the driving plan is changed. The above description is borrowed herein for the scheme of determining the cause of a change in the driving plan. The cause may be determined using the cause analysis table T.

In step S108, the processor 10 confirms that the execution of the second driving plan has been started. The processor 10 acquires, from the vehicle controller 70, information indicating that the first driving plan has been canceled and the execution of the newly calculated second driving plan has been started. When the execution of the second driving plan is not started, the subsequent process for transmission is not performed. The appropriateness of continuing the execution of the first driving plan is periodically checked, and the second driving plan as an alternative is calculated. In the actual autonomous travel control, however, it may be better to continue the first driving plan, and when the second driving plan is calculated, the second driving plan may not necessarily be executed. In one or more embodiments of the present invention, after confirming the execution of the second driving plan, the process proceeds to step S109.

In step S109, the processor 10 generates cause information of the driving plan change and transmits the generated cause information to the user terminal apparatus 300.

In step S110, the user terminal apparatus 300 displays the acquired cause information of the driving plan change on the display 331.

Figure 7A:
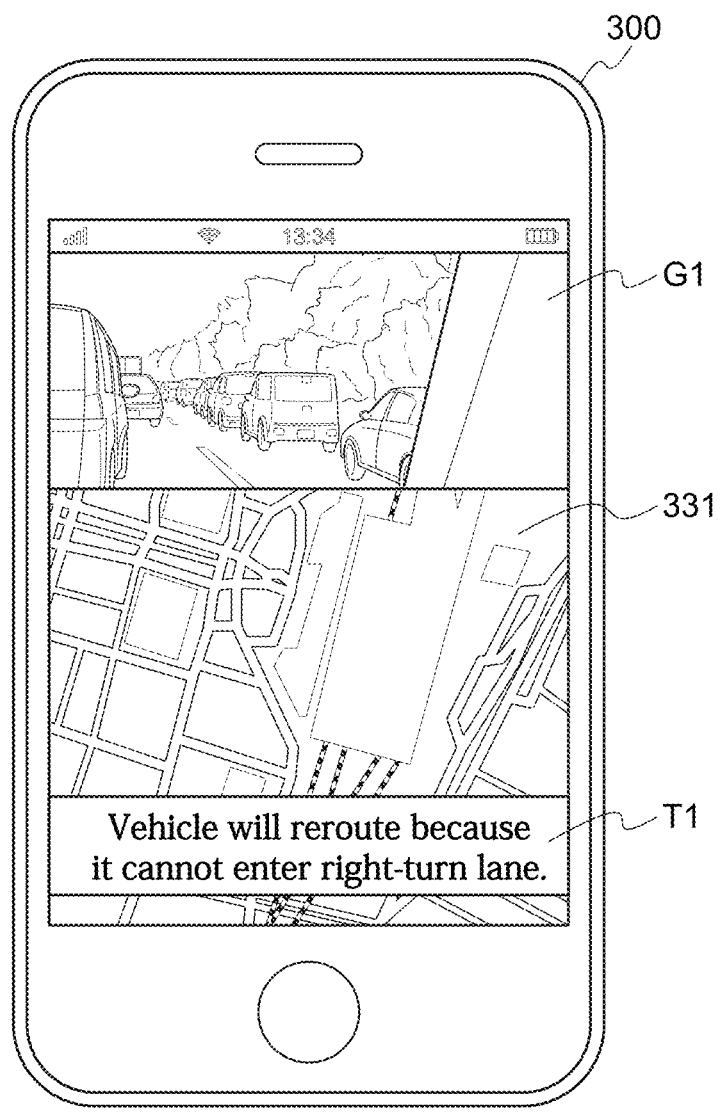
FIG. 7A is a first diagram illustrating a presentation example of cause information.
Figure 7B:
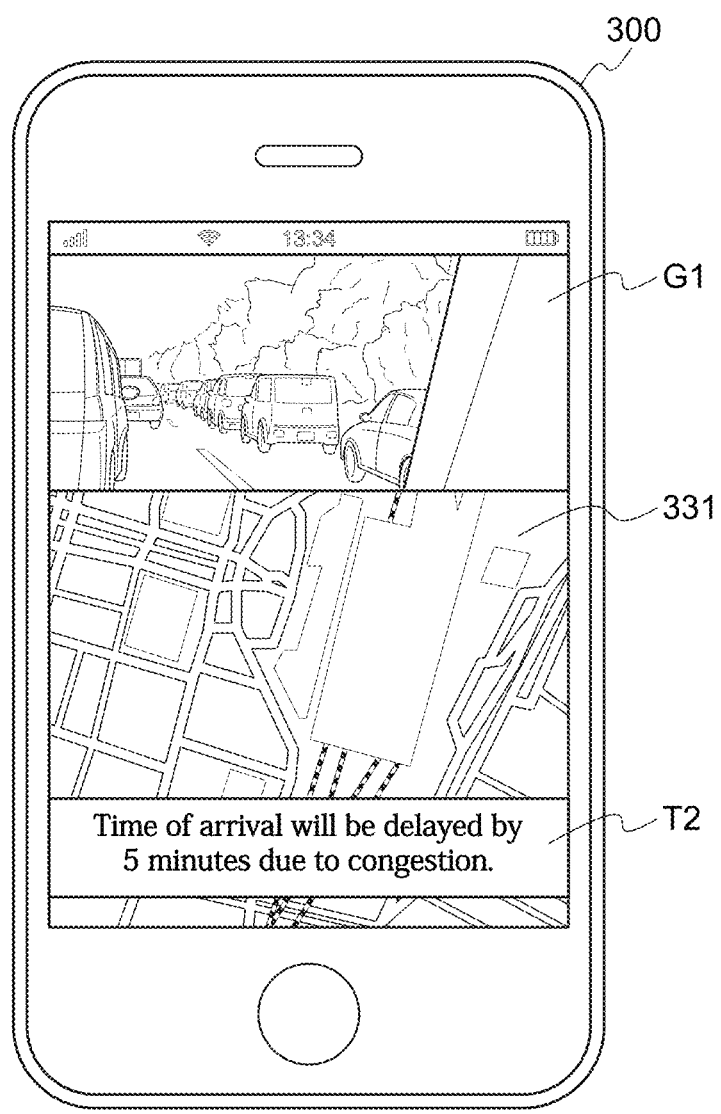
FIG. 7B is a second diagram illustrating a presentation example of cause information.
Figure 7C:
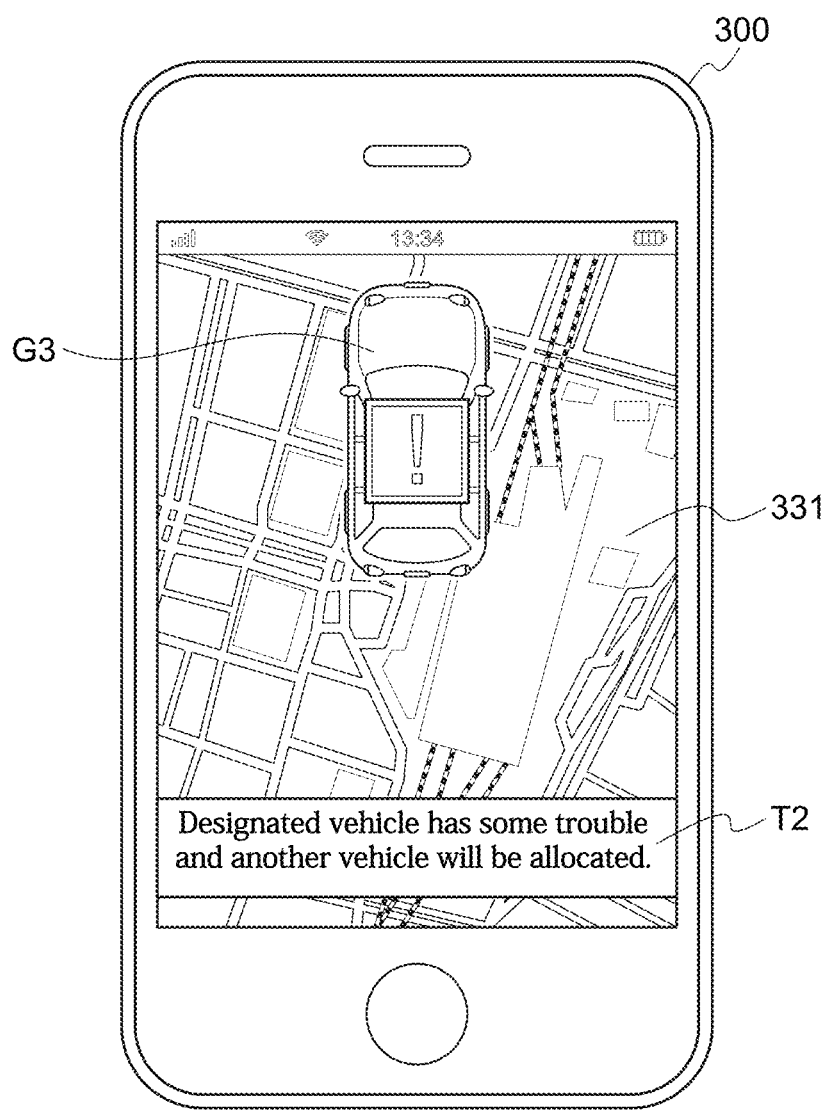
FIG. 7C is a third diagram illustrating a presentation example of cause information.

FIGS. 7A to 7C illustrate display examples of the cause information. As illustrated in FIG. 7A, the cause of a change in the driving plan with the route change (rerouting) is presented by the cause information including the text "Vehicle will reroute because it cannot enter right-turn lane." The cause information may include a captured image G1 indicating the state in which "the vehicle cannot enter the right-turn lane." As illustrated in FIG. 7B, the cause of a change in the driving plan with the delay in the estimated time of arrival is presented by the cause information including the text "Time of arrival will be delayed by 5 minutes due to congestion." The cause information may include the captured image G1 indicating the state of "congestion." As illustrated in FIG. 7C, the cause of a change in the driving plan with the change of the vehicle to be allocated is presented by the cause information including the text "Designated vehicle has some trouble and another vehicle will be allocated." The cause information may include an image G3 indicating the "trouble in the vehicle."

Figure 8:
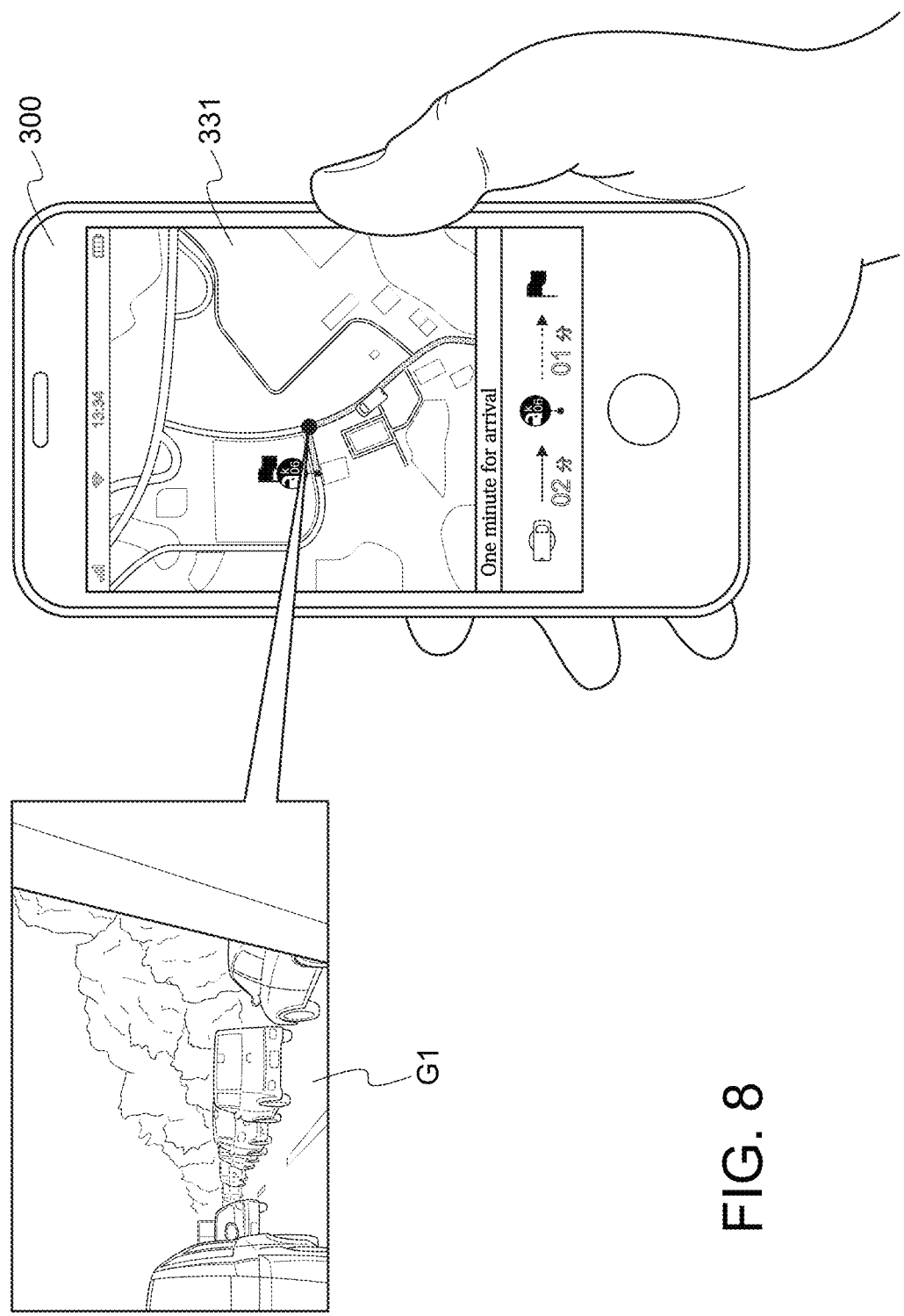
FIG. 8 is a diagram illustrating a presentation example of a driving plan and cause information.

As illustrated in FIG. 8, the "congestion in the right-turn lane" as the cause may be displayed by the captured image G1 in association with the map information, which includes the route, and the point K at which the driving plan is changed. The captured image G1 may be displayed when a point mark (circle in the figure) displayed at the point K is touched.

In step S111, the processor 10 confirms that the vehicle has arrived at the pickup point designated by the user. The process of step S103 and the subsequent processes are repeatedly performed until the target vehicle arrives at the pickup point.

The information provision apparatus 100 according to one or more embodiments of the present invention is configured and operates as the above and therefore has the following effects.

(1) According to the information provision method in one or more embodiments of the present invention, the first driving plan to be executed by the control apparatus of a vehicle is calculated in response to the request information. When the second driving plan different from the first driving plan is calculated based on the acquired detection information, the cause of a change in the driving plan is determined based on the detection information, and the cause information indicating the cause is presented to the user via the user terminal apparatus 300.

When the driving/movement of the target vehicle is started along the first driving plan, the travel environment for the target vehicle changes from moment to moment. The execution of the scheduled first driving plan may be interrupted due to the change in the travel environment, but the user can preliminarily know the cause of a change in the driving plan and can therefore wait for the arrival of the vehicle to be allocated without feeling anxiety.

When the route and current position of the vehicle are sequentially displayed on the user terminal apparatus 300, if the driving plan for the vehicle is changed and the vehicle shows a movement away from the pickup point at least temporarily, the user feels anxiety that the request made by the user may not be executed. The user who is preliminarily notified of the cause of a change in the driving plan can understand the reason of a change in the movement of the vehicle and evenly accept a change of the route, a delay of the arrival time, and a change of the vehicle.

(2) According to the information provision method in one or more embodiments of the present invention, the timing at which the second driving plan different from the first driving plan is calculated is acquired as the change timing of the driving plan, and when the change timing is acquired, the cause of a change in the driving plan is determined based on the detection information.

The timing at which the second driving plan is calculated is acquired, and the cause of a change in the driving plan is determined based on the detection information acquired at that timing; therefore, the detection information to be used for the determination of the cause can be appropriately narrowed down. As a result, the cause of a change in the driving plan can be accurately determined.

(3) According to the information provision method in one or more embodiments of the present invention, when the timing at which the second driving plan is calculated is acquired as the change timing, the cause of a change in the driving plan is determined based on the detection information. The second driving plan includes the second route different from the first route included in the first driving plan.

The timing at which the route included in the driving plan is changed is acquired, and the cause of a change in the driving plan is determined based on the detection information acquired at that timing. The cause determined at the timing at which the second driving plan including the second route is calculated is highly likely to be the cause of the route change.

The timing at which the second driving plan including the second route is calculated is acquired, and the cause of the route change is determined based on the detection information acquired at that timing; therefore, the detection information to be used for the determination of the cause can be appropriately narrowed down. As a result, the cause of a change in the driving plan due to the route change can be accurately determined.

(4) According to the information provision method in one or more embodiments of the present invention, when the timing at which the second driving plan is calculated is acquired as the change timing, the cause of a change in the driving plan is determined based on the detection information. The second driving plan includes the second estimated time of arrival later by a predetermined time or more than the first estimated time of arrival at the pickup point included in the first driving plan.

The timing at which the estimated time of arrival included in the driving plan is changed is acquired, and the cause of a change in the driving plan is determined based on the detection information acquired at that timing. The cause determined at the timing at which the second driving plan including the second estimated time of arrival is calculated is highly likely to be the cause of the delay in the estimated time of arrival.

The timing at which the second driving plan including the second estimated time of arrival is calculated is acquired, and the cause of the delay in the estimated time of arrival is determined based on the detection information acquired at that timing; therefore, the detection information to be used for the determination of the cause can be appropriately narrowed down. As a result, the cause of a change in the driving plan due to the delay in the estimated time of arrival can be accurately determined.

(5) According to the information provision method in one or more embodiments of the present invention, the timing at which the second driving plan is calculated is acquired as the change timing. The second driving plan includes the second specifying information for specifying the second vehicle different from the first specifying information for specifying the first vehicle included in the first driving plan. The processor 10 of the information provision apparatus 100 acquires the timing at which the vehicle to be allocated to the pickup point is changed, as the change timing of the driving plan. The change timing is the timing at which the second driving plan including the allocation of the second vehicle is calculated. The second vehicle is a vehicle other than the first vehicle designated in the request information. On the basis of the detection information acquired by the control apparatus 200 of the first vehicle which is driven along the first driving plan including the first specifying information for specifying the first vehicle designated in the request information, the processor 10 acquires the timing at which the second driving plan is calculated, as the change timing. The second driving plan includes the second specifying information for specifying the second vehicle different from the first vehicle.

The processor 10 determines the cause of a change in the driving plan at the timing at which a determination is made that the first vehicle designated by the user in the request information cannot be allocated and the vehicle to be allocated is changed from the first vehicle to the second vehicle. The cause determined at that timing is highly likely to be the cause that the vehicle is changed. This cause of a change in the driving plan is announced to the user. The user can know the cause that the vehicle reserved by the user is changed; therefore, the user can accept the fact the first vehicle desired in the request information is not allocated, and can wait for the arrival of another vehicle.

(6) According to the information provision method in one or more embodiments of the present invention, the cause of a change in the driving plan is determined based on the detection information with reference to the cause analysis table in which the content of the detection information and the cause are preliminarily associated with each other. By preparing the cause analysis table T in advance, it is possible to promptly determine an accurate cause.

(7) According to the information provision method in one or more embodiments of the present invention, the cause information is transmitted to the user terminal apparatus 300 at the timing at which the execution of the second driving plan is started instead of the first driving plan.

Even when a new driving plan is calculated, it may not be actually executed. In one or more embodiments of the present invention, the cause information is transmitted to the user terminal apparatus 300 at the timing at which the driving control for the target vehicle along the first driving plan is canceled and the driving control for the target vehicle along the newly calculated second driving plan is actually started. The user knows the change in the route, position, and time of arrival of the target vehicle after the driving control based on the second driving plan is started in the target vehicle. When the driving plan is changed, the cause information is presented to the user, and the user is therefore to understand the cause and then know the change in the movement of the target vehicle (change in the route, position, or arrival time). Accordingly, the user does not feel anxiety even when observing the change in the movement of the target vehicle (change in the route, position, or arrival time). Moreover, even when a new driving plan is calculated, it may not be actually executed. The cause information is presented to the user at the timing at which the driving control based on the new driving plan is actually started, and the user can therefore be prevented from being presented with the cause of the change to the new driving plan which is not actually executed. This can prevent the user from being presented with unnecessary information, and useful information for the user can be presented in a timely manner.

(8) According to the information provision method in one or more embodiments of the present invention, the cause information is generated, in which the content of the cause of a change in the driving plan is expressed in text. The cause of a change in the driving plan is expressed by text information and can therefore be accurately conveyed to the user.

(9) According to the information provision method in one or more embodiments of the present invention, the cause information is generated, in which the content of the cause of a change in the driving plan is expressed by an image. The cause of a change in the driving plan is expressed by an image and the state can therefore be accurately conveyed to the user. Moreover, the user can visually understand the state and the degree of the state through the image. The cause information including both the text and the image may be generated. The text can accurately convey the cause and the image can accurately convey the degree of the cause.

(10) According to the information provision method in one or more embodiments of the present invention, a vehicle having an autonomous travel function is used as the target vehicle (vehicle expected to be allocated). When the vehicle moves to the pickup point by autonomous traveling, the user confirms that the vehicle allocation process is being properly executed, from the change over time of the route for the vehicle. No driver is in the vehicle and it is not expected that a delay due to congestion or selection of a detour route will be reported. In the vehicle allocation system 1 according to one or more embodiments of the present invention, the cause of a change in the driving plan for a vehicle is presented to the user; therefore, the user can understand the movement of the vehicle in accordance with the cause and wait for the arrival of the vehicle without feeling anxiety. The cause of a change in the driving plan is automatically presented to the user, and it is thus not necessary for a center or the like to constantly manage the position, route, and delay of a vehicle that is traveling in an autonomous manner. The processing cost in the vehicle allocation system 1 can be reduced.

(11) The vehicle allocation system 1 according to one or more embodiments of the present invention has similar actions and effects to those obtained by the above-described information provision method.

(12) The information provision apparatus 100 according to one or more embodiments of the present invention has similar actions and effects to those obtained by the above-described information provision method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Vehicle allocation system
100 Information provision apparatus, First apparatus
10 Processor
11 CPU
12 ROM
T Cause analysis table
13 RAM
20 Communication device
30 Output device
200 Control apparatus, Onboard apparatus
40 Communication device
50 Detection device
51 Camera
52 Radar device
53 Vehicle diagnosis device
60 Sensor
61 Steering angle sensor
62 Vehicle speed sensor
70 Vehicle controller
71 Processor
80 Driving device
81 Braking device
90 Steering device
110 Output device
111 Display
112 Speaker
120 Navigation device
121 Position detection device
122 Road information
123 Map information
300 User terminal apparatus, Second apparatus
310 Processor
311 CPU
312 ROM
313 RAM
320 Communication device
330 Input/output device
331 (Touch panel-type) display
332 Speaker

The invention claimed is:

1. An information provision method for a vehicle allocation system comprising a first apparatus and a second apparatus configured to exchange information with the first apparatus, wherein
a processor of the first apparatus operates to:
calculate a first driving plan to be executed by a control apparatus of a vehicle, in response to request information input to the second apparatus from a user;
determine a cause of a change in the driving plan for the vehicle on a basis of a change in detection information acquired from the vehicle when a second driving plan different from the first driving plan is calculated for the vehicle;
at timing at which execution of the second driving plan is started instead of the first driving plan, execute control of transmitting cause information including the cause to the second apparatus to which the request information is input from the user; and when the second driving plan is not executed, execute control of not transmitting the cause information to the second apparatus, and the second apparatus operates to receive the cause information and output the received cause information by an output device, wherein the vehicle executes the first driving plan or the second driving plan in an automated manner.

2. The information provision method according to claim 1, wherein the processor of the first apparatus operates to:

acquire timing at which the second driving plan different from the first driving plan is calculated, as change timing of the driving plan; and when the change timing is acquired, determine the cause of the change in the driving plan on the basis of the detection information.

3. The information provision method according to claim 2, wherein the processor of the first apparatus operates to acquire the timing at which the second driving plan is calculated, as the change timing, wherein the second driving plan includes a second route different from a first route included in the first driving plan.

4. The information provision method according to claim 2, wherein the processor of the first apparatus operates to acquire the timing at which the second driving plan is calculated, as the change timing, wherein the second driving plan includes a second estimated time of arrival later by a predetermined time or more than a first estimated time of arrival at a pickup point included in the first driving plan.

5. The information provision method according to claim 2, wherein the processor of the first apparatus operates to acquire the timing at which the second driving plan is calculated, as the change timing, wherein the second driving plan includes second specifying information for specifying a second vehicle different from first specifying information for specifying a first vehicle included in the first driving plan.

6. The information provision method according to claim 1, wherein the processor of the first apparatus operates to determine the cause of the change in the driving plan on the basis of the detection information with reference to a cause analysis table in which content of the detection information and the cause are preliminarily associated with each other.

7. The information provision method according to claim 1, wherein the processor of the first apparatus operates to generate the cause information in which content of the cause of the change in the driving plan is expressed in text.

8. The information provision method according to claim 1, wherein the processor of the first apparatus operates to generate the cause information in which content of the cause of the change in the driving plan is expressed by an image.

9. The information provision method according to claim 1, wherein the vehicle is an automated driving vehicle having an autonomous travel function.

10. A vehicle allocation system comprising a first apparatus configured to include a processor and a second apparatus configured to include an output device and exchange information with the first apparatus, wherein the processor of the first apparatus operates to:

calculate a first driving plan to be executed by a control apparatus of a vehicle, in response to request information input to the second apparatus from a user;

determine a cause of a change in the driving plan for the vehicle on a basis of a change in detection information acquired from the vehicle when a second driving plan different from the first driving plan is calculated for the vehicle;

at timing at which execution of the second driving plan is started instead of the first driving plan, execute control of transmitting cause information including the cause to the second apparatus to which the request information is input from the user; and when the second driving plan is not executed, execute control of not transmitting the cause information to the second apparatus, and the second apparatus operates to receive the cause information and output the received cause information using the output device, wherein the vehicle executes the first driving plan or the second driving plan in an automated manner.

11. An information provision apparatus comprising:

a driving plan generation unit configured to generate a first driving plan to be executed by a control apparatus of a vehicle, in response to request information from a user;

a cause information generation unit configured to:

determine a cause of a change in the driving plan for the vehicle on a basis of a change in detection information acquired from the vehicle when a second driving plan different from the first driving plan is calculated for the vehicle; and at timing at which execution of the second driving plan is started instead of the first driving plan, generate cause information indicating the cause; and a communication control unit configured to execute control of transmitting the cause information to a terminal apparatus of the user to which the request information is input from the user and execute control of not transmitting the cause information to the second apparatus when the second driving plan is not executed, wherein the vehicle executes the first driving plan or the second driving plan in an automated manner.

* * * * *